United States Patent [19]

Hyman

[11] Patent Number: 4,756,612

[45] Date of Patent: Jul. 12, 1988

[54] EYEGLASS ASSEMBLY

[76] Inventor: Roger L. Hyman, 5249 N. 35th St., Milwaukee, Wis. 53209

[21] Appl. No.: 858,387

[22] Filed: May 1, 1986

[51] Int. Cl.$^4$ ............................ G02C 5/02; G02C 7/10
[52] U.S. Cl. ..................................... 351/133; 351/124; 351/128; 351/44
[58] Field of Search ................. 351/86, 124, 128, 133, 351/63, 140, 149, 156, 44

[56] References Cited

U.S. PATENT DOCUMENTS

| 2,537,248 | 1/1951 | Vigano | 351/124 X |
| 4,129,362 | 12/1978 | Lorenzo | 351/156 X |

Primary Examiner—Rodney B. Bovernick
Attorney, Agent, or Firm—Andrus, Sceales, Starke & Sawall

[57] ABSTRACT

An eyeglass assembly includes first and second lens holding frames, each of which has a temple piece pivotally attached to and extending rearwardly from an edge portion of the frame. The first and second frames are releasably connected to each other and the pin is completely disposed within the hole in the frame so that when the frames are connected they will be flush against each other and lying in the same vertical plane or parallel planes and no portion of the connector will be visible.

5 Claims, 1 Drawing Sheet

EYEGLASS ASSEMBLY

BACKGROUND OF THE INVENTION

The present invention relates to an eyeglass assembly and more particularly to a sunglass assembly that permits the interchanging of lens holding frames.

High fashion sunglasses have been marketed that utilize various colors for the lens holding frames and that utilize a variety of geometric shapes for the lens holding frames. These fashion sunglasses are extremely expensive and thus owning a number of pairs in various shapes and colors is prohibitive.

A number of U.S. patents show the use of interchangeable lens holding frames and patents such as U.S. Pat. No. 4,129,362, and U.S. Pat. No. Des. 147,168 show the use of interconnected and pivoting frame members. However, all of the prior art eyeglasses and sunglasses which utilize interchangeable frames or pivoting frames have exposed connectors and/or pivot points which detract from the asthetics of the eyeglasses and thus are not suitable for high fashion eyeglasses.

It is therefore desirable to provide a pair of high fashion eyeglasses or sunglasses that will have interchangeable frame members so that a number of geometric shapes and/or colors may be combined to provide a unique appearance. It is also desirable to have the interchangeable frame members connected in such a manner that the connector or pivot point is not visible and thus does not detract from the asthetics of the eyeglasses.

SUMMARY OF THE INVENTION

An eyeglass assembly includes a first and second lens holding frames, each of which has a temple piece pivotally attached to and extending rearwardly from an edge portion of the frame.

In accordance with one aspect of the invention, the frame members are interconnected by the use of a pin and a pin receiving hole located in the nose piece zone of the eyeglasses.

In accordance with another aspect of the invention, locking means are provided to prevent the rotation of the frames about the connection point.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
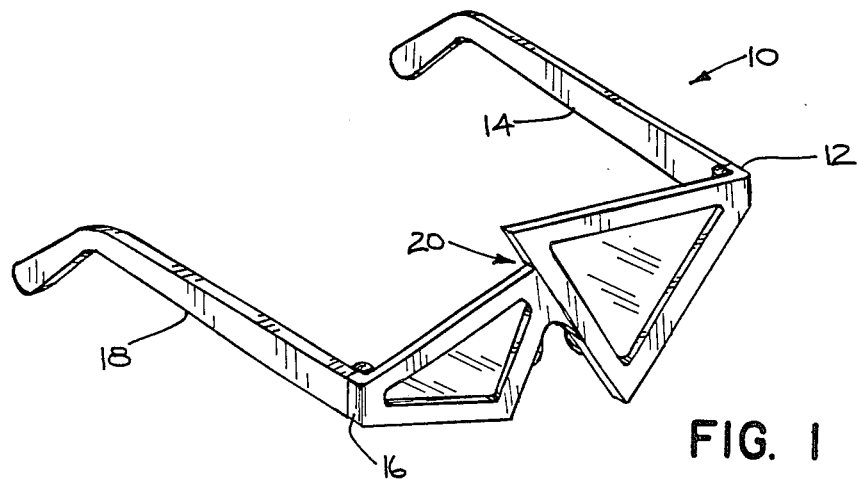
FIG. 1 is a perspective view of a pair of eyeglasses constructed according to the present invention.

As seen in FIG. 1, an eyeglass or sunglass assembly 10 consists of a left hand frame member 12 having a temple piece 14 pivotally connected to and extending rearwardly from the outer edge of frame member 12 and a right hand frame member 16 that also has a temple piece 18 pivotally connected and rearwardly extending from an outer edge of frame member 16. Right hand frame member 16 is provided with a curved portion 19 which defines a nose bridge portion and cooperates with left hand frame member 12 to define a complete nose bridge.

Left and right hand frame members are connected in the nose piece zone 20 by means of connection 22 having male and female mating portions 24 and 26. In the embodiment shown in FIG. 2, right hand frame member 16 is provided with a projecting pin 24 that extends outwardly from and substantially parallel to the nose piece zone of right hand frame member 16. Left hand frame member 12 is provided with a hole 26 for accepting pin 24. Hole 26 is dimensioned so as to provide a friction fit for pin 24 in order to maintain pin 24 within hole 26. Applicant also foresees that pin 24 could be provided with ridges or other projections and hole 26 could be provided with grooves or notches so as to provide a ridge/groove type detent in order to maintain pin 24 within hole 26.

Connector pin 24, when inserted into hole 26 will be completely disposed within hole 26 so no portion of pin 24 will remain visible and the frame members will abut and be flush against each other.

Figure 2:
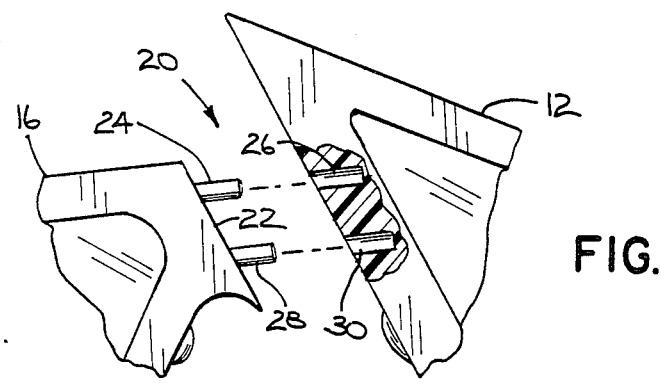
FIG. 2 is an enlarged view of the connection in the nose piece zone with parts broken away.

As seen in FIG. 2, a second locking pin 28 is provided in nose piece zone 20. Pin 28 mates with hole 30 in a manner similar to that of pin 24 and hole 26 and prevents rotation of frame members 12 and 16 about the connection point.

Figure 3:
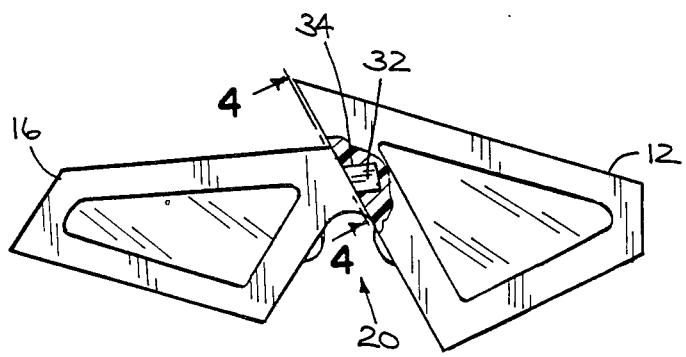
FIG. 3 is a perspective view with parts broken away of an alternate embodiment of the invention.
Figure 4:
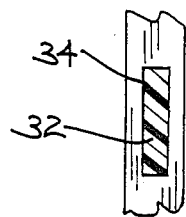
FIG. 4 is a section taken along line 4—4 of FIG. 3.

FIG. 3 and FIG. 4 illustrate an alternate embodiment in which the connection in nose piece zone 20 is accomplished by means of a multi-sided pin or projection 32 that mates with a hole 34 having a similar geometry. This embodiment eliminates the need for locking pin 28 since the geometry of pin 32 prevents its rotation within hole 34 and thus the rotation of frame members 12 and 16 about the connection point is prohibited.

As illustrated by the figures, the glasses can be formed by a pair of frame members having dissimilar geometric shapes joined by means of the connection. The present invention thus provides for the joining of either symetric or asymetic lens holding frames in a single eyeglass assembly.

The present invention thus provides an eyeglass assembly having readily interchangeable lens holding frames while providing for the joining of the frames in such a manner that the frames are flush against each other and lying in the same vertical plane when joined and the connector joining the frames is not visible.

Various modes for carrying out the invention are contemplated as being within the scope of the following claims particularly pointing out and distinctly claiming the subject matter which is regarded as the invention.

I claim:

1. An eyeglass assembly comprising:
   a separate and distinct first lens holding frame having a temple piece pivotally attached to and extending rearwardly from an edge portion of said first frame and a curved portion defining a nose bridge portion
   a separate and distinct second lens holding frame having a temple piece pivotally attached to and extending rearwardly from an edge portion of said second frame
   said first and second frames releasably connected to each other at a connection point in the nose piece zone with one of said frames having a pin receiving hole disposed within the nose piece zone of said frame and the other of said frames having a pin projecting from the nose piece zone of said other frame and said frames having abutting edge surfaces so that upon connection a hidden seam will be formed between said frame pieces and no portion of the connection will be visible so as to give the impression of an integral eyeglass frame and said curved portion of said first frame cooperates with a portion of said second frame to define a complete nose bridge.

2. The eyeglass assembly defined in claim 1 further comprising locking means to prevent rotation of the frames about the connection point.

3. The eyeglass assembly defined in claim 2 wherein said locking means comprises a second pin projecting from one of said frames and a pin receiving hole in the other of said frames, said pin and hole being disposed on said frames in such a manner that upon connection of said frames said pin engages said hole and prevents the rotation of said frames about said connection point.

4. The eyeglass assembly defined in claim 1 wherein said frames are of dissimilar geometric shapes.

5. The eyeglass assembly defined in claim 1 wherein said pin is in the form of solid projection having a plurality of definitive sides, with said pin mating with a hole of similar geometry so that rotation of the pin within the hole is prevented.

* * * * *